US012638799B2

(12) United States Patent
Ohno

(10) Patent No.: US 12,638,799 B2
(45) Date of Patent: May 26, 2026

(54) SHEET FEEDING APPARATUS AND IMAGE FORMING APPARATUS

(71) Applicant: Toshiba Tec Kabushiki Kaisha, Tokyo (JP)

(72) Inventor: Masahiro Ohno, Yokohama Kanagawa (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 71 days.

(21) Appl. No.: 18/666,727

(22) Filed: May 16, 2024

(65) Prior Publication Data

US 2025/0147460 A1 May 8, 2025

(30) Foreign Application Priority Data

Nov. 7, 2023 (JP) ................................ 2023-189974

(51) Int. Cl.
*G03G 15/00* (2006.01)
*B65H 1/04* (2006.01)
*B65H 1/08* (2006.01)

(52) U.S. Cl.
CPC ........... *G03G 15/6511* (2013.01); *B65H 1/08* (2013.01); *G03G 15/6558* (2013.01); *B65H 2557/13* (2013.01); *G03G 2215/00443* (2013.01)

(58) Field of Classification Search
None
See application file for complete search history.

(56) References Cited

U.S. PATENT DOCUMENTS

| | | | | |
|---|---|---|---|---|
| 4,005,794 A * | 2/1977 | Lundquist | B65H 1/04 271/171 | |
| 2009/0230608 A1* | 9/2009 | Kimura | B65H 1/08 271/10.01 | |
| 2011/0062656 A1 | 3/2011 | Shimosato et al. | | |
| 2021/0229950 A1* | 7/2021 | Ishikawa | H04N 1/00612 | |

FOREIGN PATENT DOCUMENTS

| | | | | |
|---|---|---|---|---|
| JP | S59-203023 A | | 11/1984 | |
| JP | H06293439 A | * | 10/1994 | |
| JP | 2006-282323 A | | 10/2006 | |
| JP | 2007131364 A | * | 5/2007 | |
| JP | 2018-203407 A | | 12/2018 | |

OTHER PUBLICATIONS

English language translation of JP 2007-131364 A, publication date May 31, 2007. (Year: 2007).*
English language abstract of JP 06-293439 A, publication date Oct. 21, 1994. (Year: 1994).*

* cited by examiner

*Primary Examiner* — Leslie J Evanisko
(74) *Attorney, Agent, or Firm* — Kim & Stewart LLP

(57) ABSTRACT

A sheet feeding apparatus includes a tray on which a plurality of sheets can be stacked, the tray being movable in a vertical direction to lift the sheets, a pickup roller that is rotatable to convey an uppermost sheet of the sheets in a conveyance direction when the sheets are lifted and pressed against the pickup roller, a first guide that is disposed adjacent to the pickup roller and guides the uppermost sheet conveyed by the pickup roller along the conveyance direction, and a pair of lifting members that support the sheets that are stacked in the tray. The lifting members extend along the conveyance direction, are spaced apart in a width direction of the sheets that is transverse to the conveyance direction, and are movable in the vertical direction together with the tray.

19 Claims, 10 Drawing Sheets

SHEET FEEDING APPARATUS AND IMAGE FORMING APPARATUS

CROSS-REFERENCE TO RELATED APPLICATION(S)

This application is based upon and claims the benefit of priority from Japanese Patent Application No. 2023-189974, filed Nov. 7, 2023, the entire contents of which are incorporated herein by reference.

FIELD

Embodiments described herein relate generally to a sheet feeding apparatus and an image forming apparatus.

BACKGROUND

Various kinds of image forming apparatuses are used to form an image on a sheet. Such image forming apparatuses have a sheet feeding apparatus for feeding a sheet, but a sheet feeding failure sometimes occurs due to mechanical reasons. There is a need for a sheet feeding apparatus capable of suppressing such a sheet feeding failure.

SUMMARY OF THE INVENTION

Embodiments of the present disclosure provide a sheet feeding apparatus capable of suppressing a sheet feeding failure.

A sheet feeding apparatus includes a tray on which a plurality of sheets can be stacked, the tray being movable in a vertical direction to lift the sheets, a pickup roller that is rotatable to convey an uppermost sheet of the sheets in a conveyance direction when the sheets are lifted and pressed against the pickup roller, a first guide that is disposed adjacent to the pickup roller and guides the uppermost sheet conveyed by the pickup roller along the conveyance direction, and a pair of lifting members that support the sheets that are stacked in the tray. The lifting members extend along the conveyance direction, are spaced apart in a width direction of the sheets that is transverse to the conveyance direction, and are movable in the vertical direction together with the tray.

DETAILED DESCRIPTION

Hereinafter, embodiments will be described in detail with reference to the drawings. The present disclosure is not limited to the embodiments described below.

Hereinafter, a sheet feeding apparatus according to an embodiment will be described with reference to the drawings.

Figure 1:
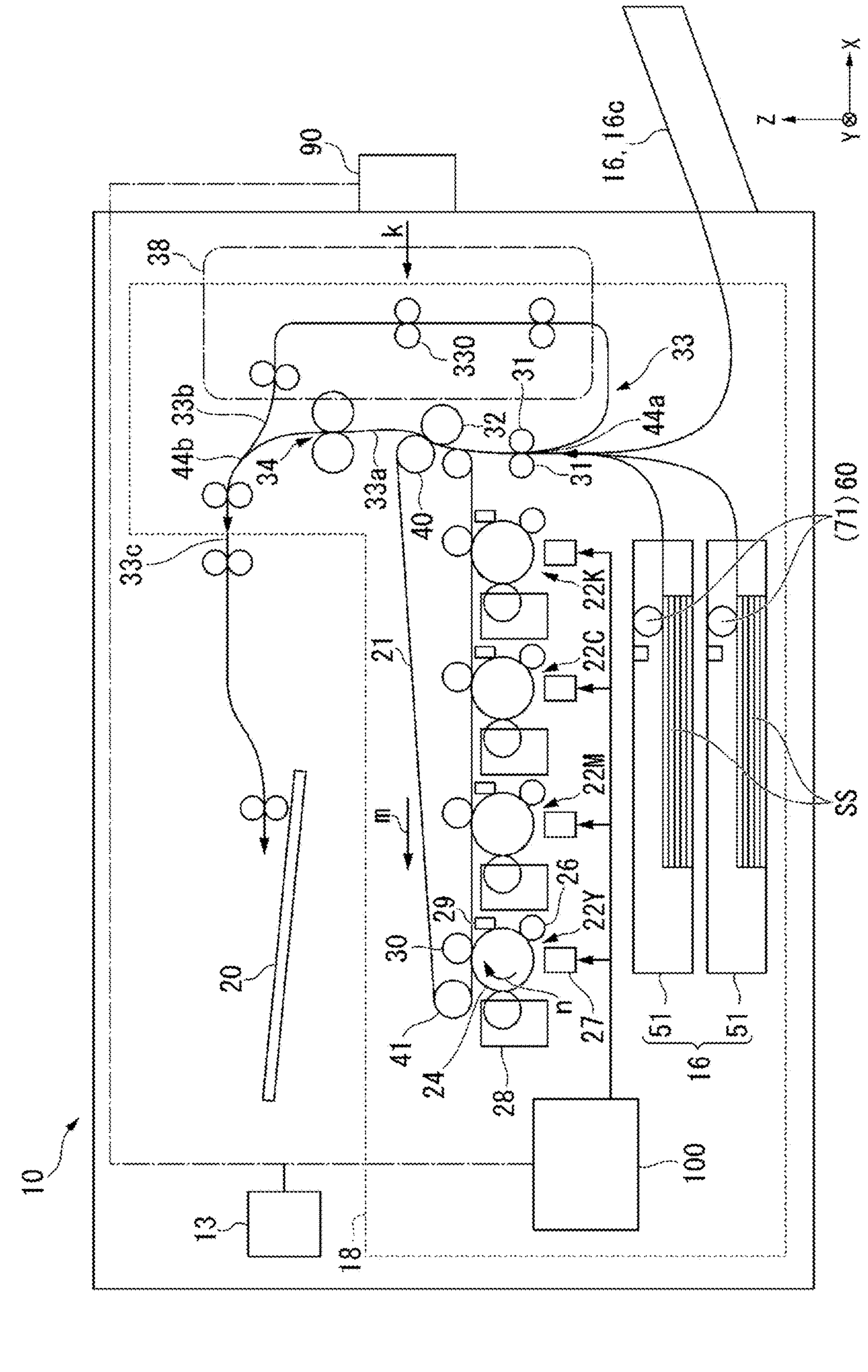
FIG. 1 is an explanatory diagram illustrating a configuration of an image forming apparatus.

First, a configuration of an image forming apparatus 10 according to the embodiment will be described with reference to FIG. 1. FIG. 1 is an explanatory diagram illustrating a configuration of the image forming apparatus 10. For example, the image forming apparatus 10 is disposed in a workplace such as an office.

In the present application, a Z direction, a X direction, and a Y direction of the orthogonal coordinate system are defined as follows. The Z direction corresponds to a height direction of the image forming apparatus 10, and the +Z direction is an upward direction. The X direction corresponds to the left-right direction of the image forming apparatus 10, and the +X direction is the right direction. The Y direction corresponds to the front-rear or width direction of the image forming apparatus 10. In the Y direction, a side close to the center of the sheet feed cassette 51 may be referred to as an inner side, and a side far from the center may be referred to as an outer side. The Z direction is sometimes referred to as the vertical direction, and the X direction and the Y direction are each referred to as the horizontal direction.

In FIG. 1, the image forming apparatus 10 includes a control panel 13, a wireless tag communication device 90, and a printer unit 18. The printer unit 18 includes a control unit 100, a sheet feed cassette 51, a conveying device 60, and the like. The control unit 100 is a controller that controls the control panel 13, the wireless tag communication device 90, and the printer unit 18. The control unit 100 controls conveyance of a sheet in the printer unit 18. The control of the conveyance of a sheet is to control the conveyance timing of the sheet, the stop position of the sheet, the conveyance speed of the sheet, and the like.

The control panel 13 includes an input key and a display unit. For example, the input key receives an input by the user. For example, the display unit is of a touch panel type. The display unit receives an input from the user and displays the input to the user. For example, the control panel 13 displays settings related to the operation of the image forming apparatus 10 on the display unit. The control panel 13 notifies the control unit 100 of the settings set by the user.

The sheet feed cassette 51 stores a sheet to which a wireless tag is attached. The sheet feed cassette 51 can also store a sheet to which a wireless tag is not attached. In the following description, unless otherwise specified, the stored sheet is a sheet with a wireless tag. As the sheet, for example, a material such as paper or a plastic film is used.

The printer unit 18 performs an operation of forming an image. For example, the printer unit 18 forms an image based on image data on a sheet. In the following description, forming an image on a sheet is also referred to as "printing". In the present embodiment, the printer unit 18 is a device that fixes a toner image on a sheet, but the present invention is not limited thereto, and may be an ink jet type device.

The printer unit 18 includes an intermediate transfer belt 21. The printer unit 18 supports the intermediate transfer belt 21 with a driven roller 41, a backup roller 40, and the like. The printer unit 18 rotates the intermediate transfer belt 21 in the direction of arrow m. The printer unit 18 comprise four sets of image forming stations 22Y, 22M, 22C and 22K. The respective image forming stations 22Y, 22M, 22C and 22K correspond to Y (yellow), M (magenta), C (cyan) and K (black), respectively. The image forming stations 22Y, 22M, 22C and 22K are disposed below the intermediate transfer belt 21 along the rotational direction of the intermediate transfer belt 21.

Hereinafter, of the image forming stations 22Y, 22M, 22C and 22K, the image forming station 22Y will be described by way of example. Since the image forming stations 22M, 22C and 22K have the same configuration as the image forming station 22Y, detailed explanation thereof will be omitted.

The image forming station 22Y comprises a primary transfer roller 30. The primary transfer roller 30 is disposed to face a photosensitive drum 24 via the intermediate transfer belt 21.

The image forming station 22Y includes an electrostatic charger 26, an exposure scanning head 27, a developing device 28, and a photoconductor cleaner 29. The electrostatic charger 26, the exposure scanning head 27, the developing device 28, and the photoconductor cleaner 29 are disposed around the photosensitive drum 24 that rotates in the direction of arrow n.

The electrostatic charger 26 uniformly charges the photosensitive drum 24. The exposure scanning head 27 exposes the uniformly charged photosensitive drum 24 to form an electrostatic latent image on the photosensitive drum 24. The developing device 28 develops an electrostatic latent image on the photosensitive drum 24 using a two-component developer formed by toner and a carrier.

The primary transfer roller 30 performs primary transfer of the toner image formed on the photosensitive drum 24 to the intermediate transfer belt 21. The primary transfer roller 30 of each of the image forming stations 22Y, 22M, 22C and 22K performs the primary transfer of the toner image on the intermediate transfer belt 21, thereby forming a color toner image on the intermediate transfer belt 21. The color toner image is a toner image formed by sequentially superimposing toner images of Y (yellow), M (magenta), C (cyan), and K (black). The photoconductor cleaner 29 removes toner remaining on the photosensitive drum 24 after the primary transfer.

The printer unit 18 includes a secondary transfer roller 32. The secondary transfer roller 32 is disposed to face the backup roller 40 via the intermediate transfer belt 21. The secondary transfer roller 32 collectively performs secondary transfer of the color toner images on the intermediate transfer belt 21 onto the sheet. In the following description, a "toner image" may be either a color toner image or a toner image of only one color. The toner image may be a toner image using decolorable toner, which can be decolorable at a predetermined temperature.

A conveyance path 33 is a path along which a sheet is conveyed by a plurality of conveyance rollers (for example, conveyance rollers 330 and the like). The conveyance path 33 includes a first conveyance path 33*a*, a second conveyance path 33*b*, and a third conveyance path 33*c*. The first conveyance path 33*a* is a conveyance path from a merging portion 44*a* to a branching portion 44*b*. The second conveyance path 33*b* is a conveyance path passing through a duplex printer 38, and is a conveyance path that differs from the first conveyance path 33*a* from a branching portion 44*b* to a merging portion 44*a*. The third conveyance path 33*c* is a conveyance path from the branching portion 44*b* to a sheet discharge tray 20.

The sheet is taken out from a sheet placing unit 16 of either the sheet feed cassette 51 or a manual feed tray 16*c*. The sheet taken out from the sheet placing unit 16 is temporarily stopped at a portion where the two registrant rollers 31 are in contact with each other. At this time, the leading edge of the sheet abuts against the registrant rollers 31, and the inclination of the sheet is corrected. The control unit 100 starts the rotation of the registrant rollers 31 in accordance with the position of the toner image of the rotating intermediate transfer belt 21, and moves the sheet to the position of the secondary transfer roller 32.

The toner image formed on the intermediate transfer belt 21 is secondarily transferred to the sheet by the secondary transfer roller 32. Further, the toner image that has been secondarily transferred is fixed to the sheet by a fixing device 34. In this manner, an image is formed on the sheet under the control of the control unit 100. The control unit 100 conveys the sheet on which the toner image has been fixed by the fixing device 34 to the third conveyance path 33*c*, and discharges the sheet.

The wireless tag communication device 90 includes a processor, a storage device, and an antenna (not shown). The wireless tag in the present embodiment is, for example, a radio frequency identifier (RFID) tag. The wireless tag communication device 90 transmits radio waves in the direction of arrow k, for example. The wireless tag communication device 90 communicates with a wireless tag provided on a sheet via an antenna. Specifically, the wireless tag communication device 90 reads information from the wireless tag and writes information to the wireless tag.

The information written on the wireless tag includes, for example, information indicating the contents of a container to which the sheet is attached, information indicating a destination of the container, and what is printed on the sheet when the sheet is used for logistics or the like. In the present embodiment, for example, a radio wave system (UHF) of a 900 MHz band is used as the wireless tag communication device 90. However, RFID method and the frequency band are not limited thereto, and other methods and frequency bands may be adopted.

The control unit 100 controls each component of the image forming apparatus 10.

Figure 2:
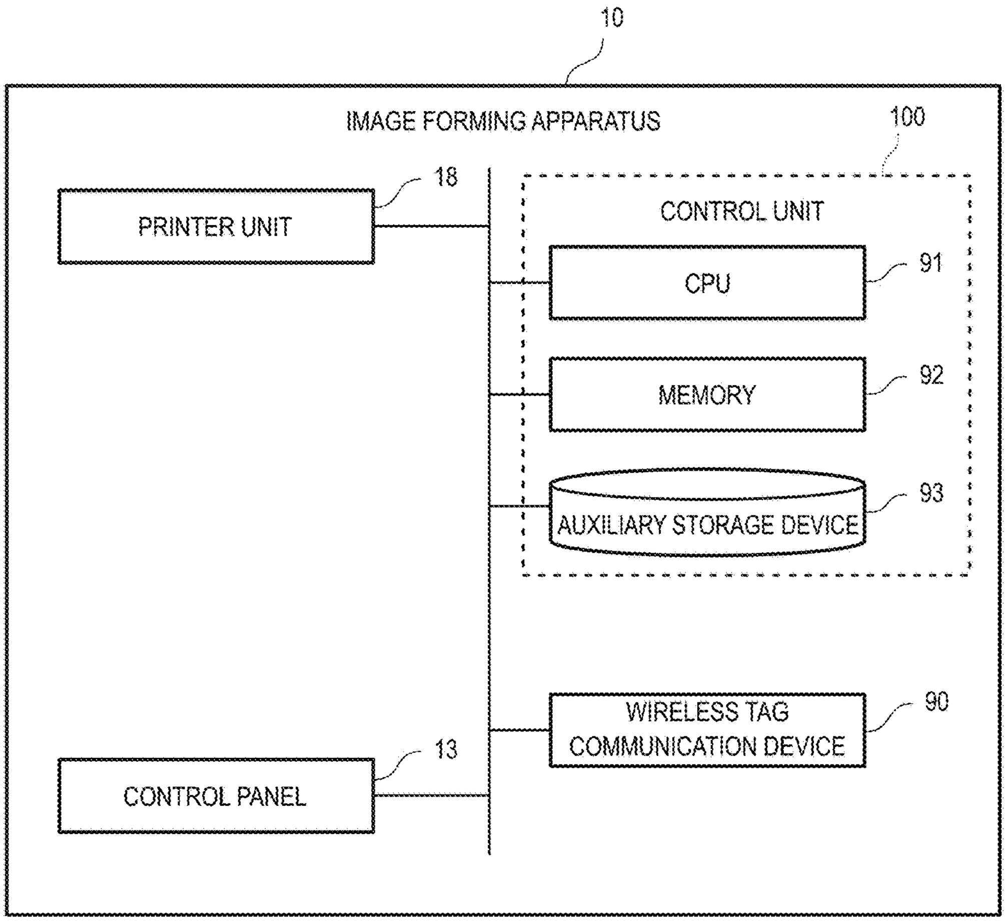
FIG. 2 is a hardware configuration diagram of the image forming apparatus.

FIG. 2 is a hardware configuration diagram of the image forming apparatus 10. As illustrated in FIG. 2, the image forming apparatus 10 includes a processor such as a central processing unit (CPU) 91, a memory 92, and an auxiliary storage device 93 connected by a bus. The image forming apparatus 10 executes programs to control the printer unit 18, the control panel 13, and the wireless tag communication device 90.

The control unit 100 or the CPU 91 executes programs stored in the memory 92 and the auxiliary storage device 93. The control unit 100 controls the operation of each functional unit of the image forming apparatus 10.

The auxiliary storage device 93 is a storage device such as a magnetic hard disk device or a semiconductor storage device. The auxiliary storage device 93 stores programs and information.

Figure 3:
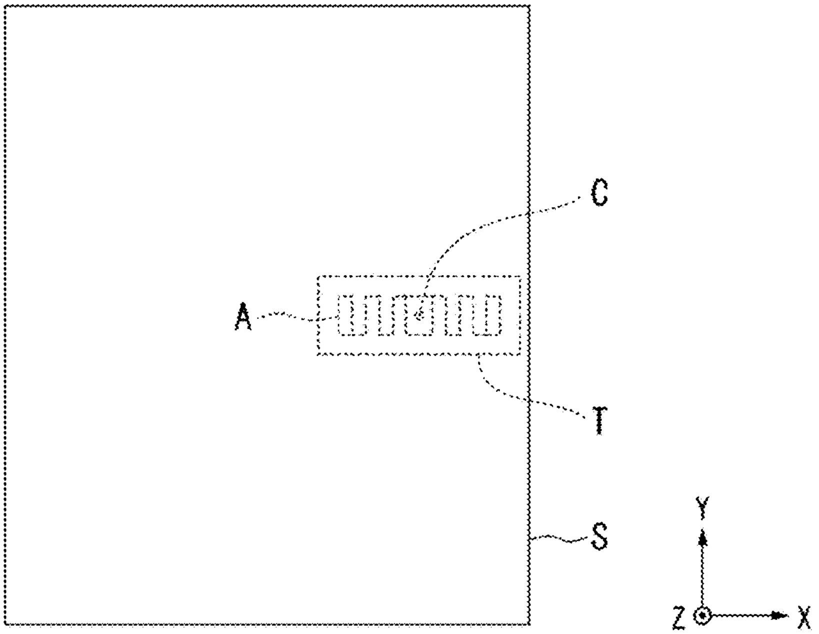
FIG. 3 is a plan view of a sheet having a wireless tag.

FIG. 3 is a plan view of a sheet S having a wireless tag T. FIG. 3 shows the sheet S accommodated in the sheet feed cassette 51. In FIG. 3, the thickness direction of the sheet S coincides with the Z direction, and the width direction coincides with the Y direction.

For example, the sheet S is a standard-size sheet. The image forming apparatus 10 forms an image on such a standard-size sheet of various sizes. Among the sizes of the standard-size sheets, the size of the A-series such as A4 is specified in the international standard ISO216 which specifies the size of the sheet. The B-series, such as B5, is specified in ISO216 or Japanese Industrial Standards JIS-B Series. LT is a letter size and is defined as an ANSI A in the American National Standards Institute ANSI/ASME Y14.1. LG is a legal size. In the present application, among the standard-size sheets on which the image forming apparatus 10 forms an image, a standard-size sheet having the maximum width in the Y direction is defined as the maximum standard-size sheet.

The sheet S includes a wireless tag T. The wireless tag T is disposed inside the sheet S in the thickness direction. The wireless tag T may be mounted on the surface of the sheet S. For example, the wireless tag Tis disposed at an end portion in the +X direction in the center portion of the sheet S in the Y direction. The wireless tag T may be arranged at any position different from that of FIG. 3. The wireless tag T has a rectangular shape when viewed in the Z direction. For example, the wireless tag T is disposed on the sheet S such that the longitudinal direction is aligned with the X direction and the lateral direction is aligned with the Y direction. The wireless tag T may be arranged on the sheet S in any direction.

The wireless tag T includes an antenna A and an IC chip C. The antenna A transmits and receives radio waves and the like to and from the wireless tag communication device 90. The IC chip C records and processes the data received from the wireless tag communication device 90. The wireless tag T has a thickness in the Z direction. The thickness of the sheet S of the portion where the wireless tag T is disposed is larger than that of the other portions. In particular, the thickness of the sheet S of the portion where IC chip C is disposed is larger than that of the other portions.

Figure 4:
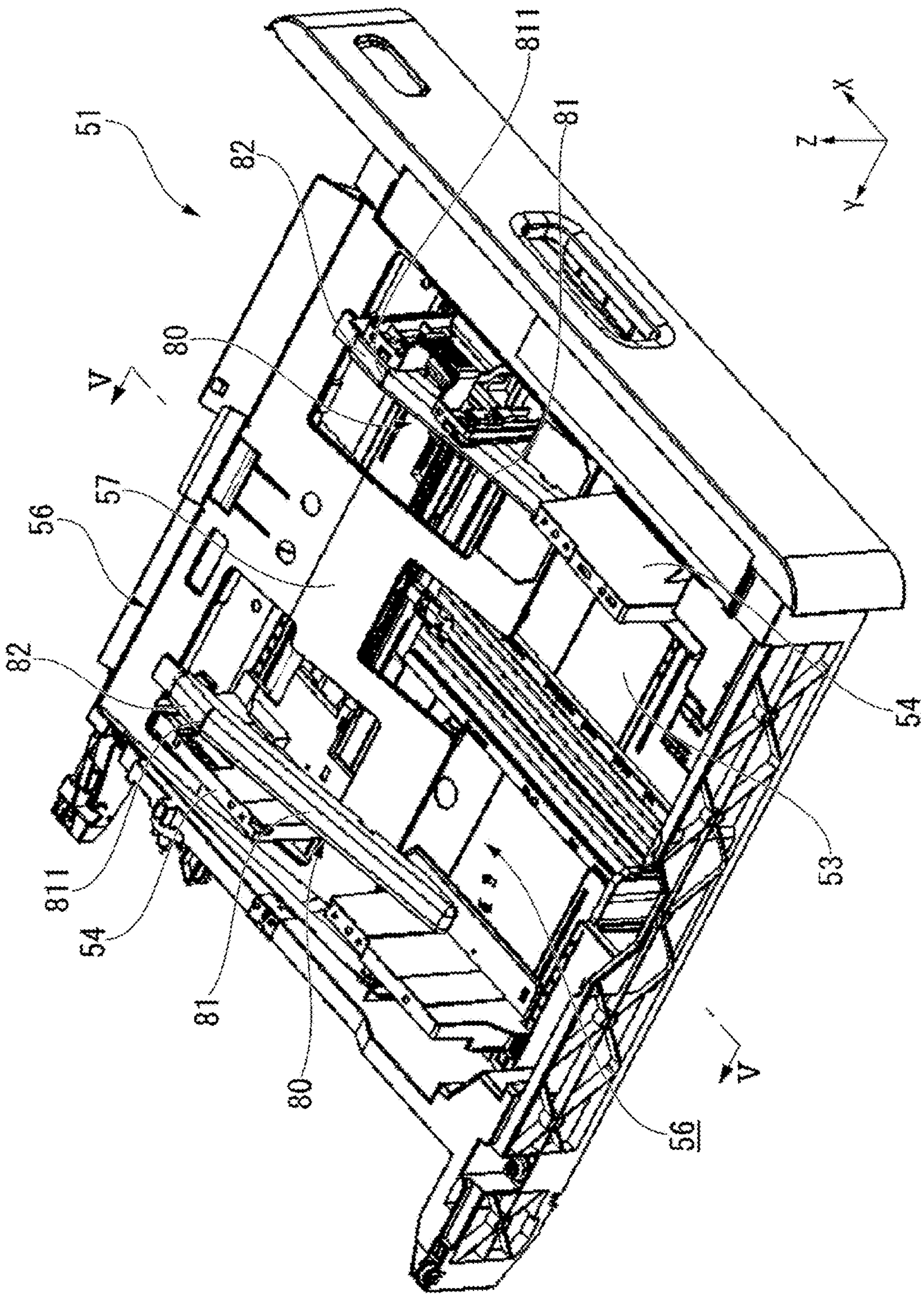
FIG. 4 is a perspective view of a sheet feed cassette.
Figure 5:
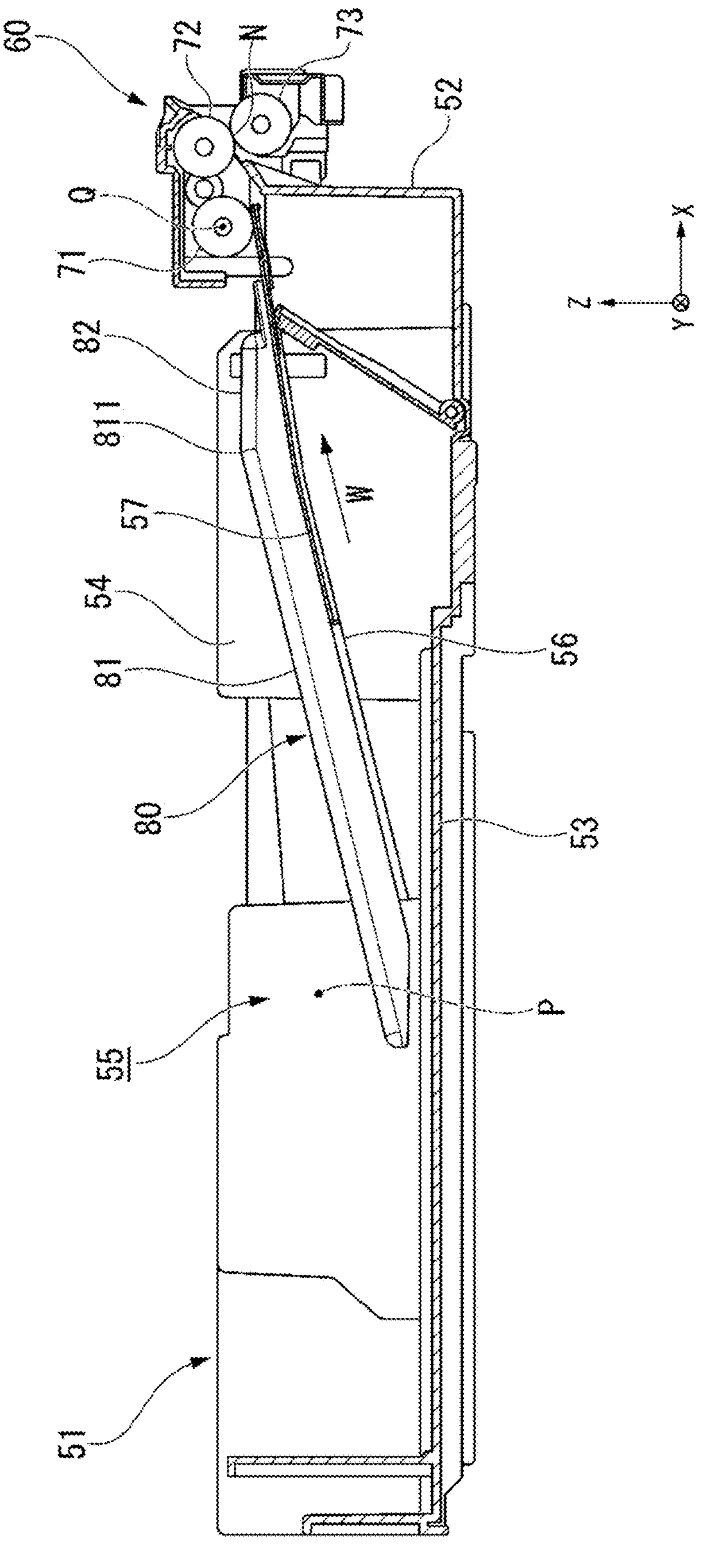
FIG. 5 is a cross-sectional view of the sheet feed cassette and a conveying device at a position corresponding to V-V of FIG. 4.

FIG. 4 is a perspective view of the sheet feed cassette 51. FIG. 5 is a cross-sectional view of the sheet feed cassette 51 and the conveying device 60 at a position corresponding to V-V of FIG. 4. As shown in FIGS. 4 and 5, the sheet feed cassette 51 has a box shape that opens in the +Z direction. The sheet feed cassette 51 stores a sheet bundle SS (see FIGS. 9 and 10) in which a plurality of sheets S each having a wireless tag T are stacked in the thickness direction. The sheet feed cassette 51 includes a cassette front wall 52, a cassette bottom wall 53, a pair of side guides 54, a sheet storage space 55, and a sheet feed tray 56.

The cassette front wall 52 is a side wall of the sheet feed cassette 51 in the +X direction. The cassette front wall 52 extends in the −Z direction from the open end of the sheet feed cassette 51 in the +Z direction. The cassette front wall 52 faces an end portion of the sheet S stored in the sheet feed cassette 51 in the +X direction. The cassette bottom wall 53 extends from the end in the −Z direction of the cassette front wall 52 in the −X direction. The cassette bottom wall 53 extends parallel to XY plane.

The pair of side guides 54 is disposed inside the sheet feed cassette 51. The side guides 54 are plate-shaped and are parallel to XZ plane. The two side guides 54 are disposed apart in the Y direction. The pair of side guides 54 are movable inward and outward in the Y direction in synchronization with each other. The pair of side guides 54 abut on both end portions of the sheet S in the Y direction, and align the sheet S in the Y direction. The center of the sheet S in the Y direction is disposed in the center of the sheet feed cassette 51 in the Y direction.

The sheet storage space 55 is a space on the −X side of the cassette front wall 52 and inside the pair of side guides 54 in the Y-direction. The sheet storage space 55 is capable of storing a sheet of the maximum standard size. The sheet storage space 55 is capable of storing a sheet bundle SS.

The sheet feed tray 56 is disposed at the bottom of the sheet storage space 55. The sheet feed tray 56 has a placing surface 57 on which the sheet bundle SS is placed. The sheet feed tray 56 can be moved up and down. The regular state of the sheet feed tray 56 is a state in which it is at the lower end position lowered to the cassette bottom wall 53. In the regular state of the sheet feed tray 56, the placing surface 57 faces in the +Z direction. The sheet feed tray 56 is rotatable about a rotation shaft P. The sheet feed tray 56 is moved up and down by rotating about the rotation shaft P. The rotation shaft P is parallel to the Y direction. The rotation shaft P is located at a position in the −X direction relative to an end portion of the sheet feed tray 56 in the +X direction. By the rotation of the sheet feed tray 56, the end portion of the sheet feed tray 56 in the +X direction moves in the Z direction. When the sheet feed tray 56 rotates from the regular state, the end portion of the sheet bundle SS in the +X direction moves in the +Z direction. FIG. 4 to FIG. 8 show a state in which the sheet feed tray 56 is rotated from the regular state. Between the pair of side guides 54, an end portion of the placing surface 57 in the −X direction is located at an intermediate portion of the sheet storage space 55 in the X direction. The cassette bottom wall 53 can support −X end of the sheet bundle SS placed on the placing surface 57.

Figure 6:
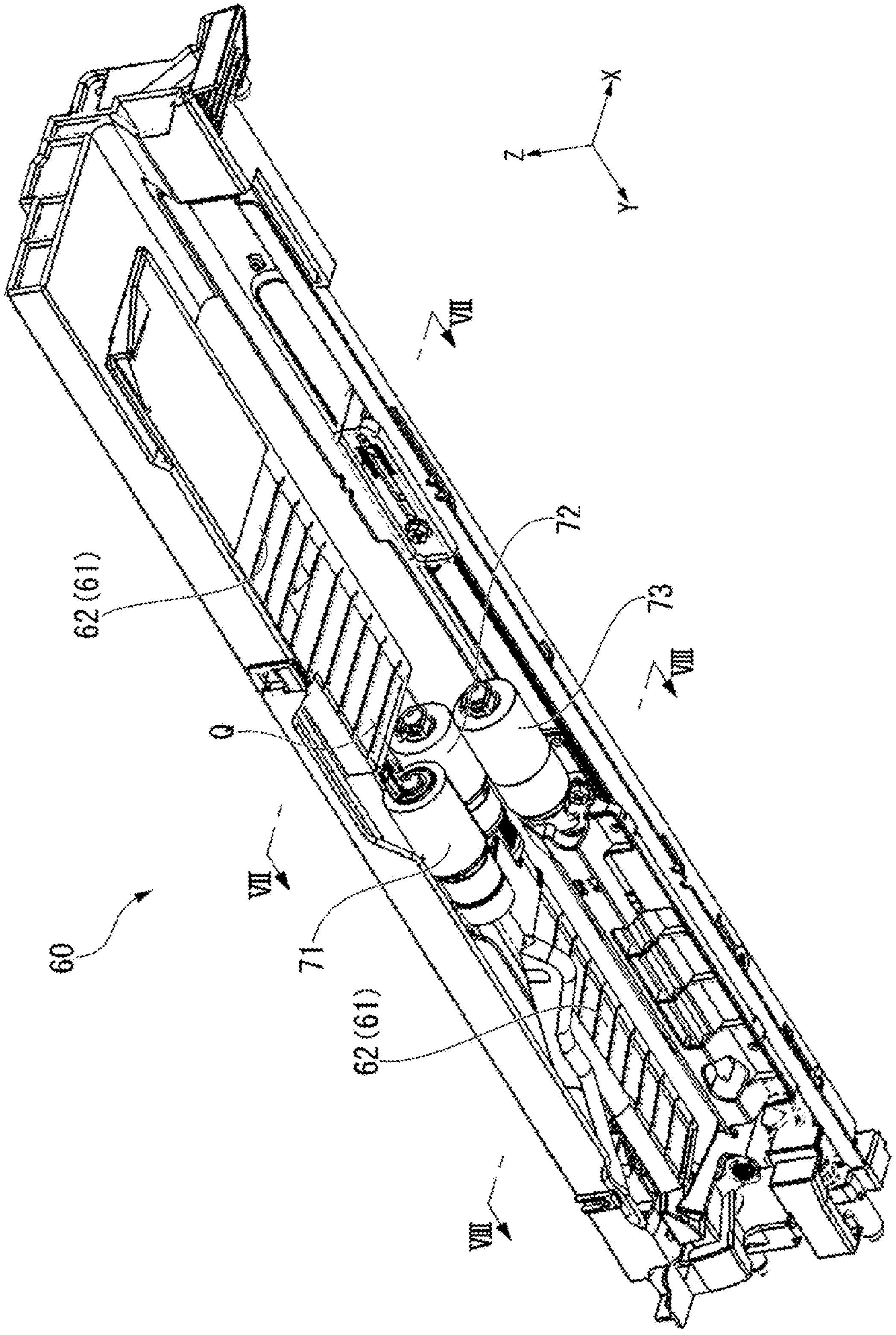
FIG. 6 is a perspective view of the conveying device.

FIG. 6 is a perspective view of the conveying device 60. As illustrated in FIGS. 5 and 6, the conveying device 60 includes a pickup roller 71, a conveyance guide 61, a sheet feed roller 72, and a separation roller 73.

The pickup roller 71 is disposed in the +Z direction of the sheet feed cassette 51. The pickup roller 71 is disposed at a position corresponding to an end portion of the sheet feed cassette 51 in the +X direction in the center portion in the Y direction. The pickup roller 71 is in contact with the center portion of the sheet bundle SS in the −Y direction. The pickup roller 71 rotates about a rotation axis Q parallel to the Y direction. The pickup roller 71 is rotationally driven by a motor or the like. The pickup roller 71 is movable in the Z direction independently of the sheet feed tray 56.

The sheet feeding operation of the pickup roller 71 will be described. In the sleep state of the image forming apparatus 10, the sheet feed tray 56 is lowered to the cassette bottom wall 53, and the pickup roller 71 is raised in the +Z direction. A user of the image forming apparatus 10 pulls out the sheet feed cassette 51 from the image forming apparatus 10. The user fills the sheet storage space 55 of the sheet feed cassette 51 with the sheet bundle SS.

The user pushes the sheet feed cassette 51 into the image forming apparatus 10. The pickup roller 71 is lowered. The sheet feed tray 56 is rotated to raise the end portion of the sheet bundle SS in the +X-direction. The pickup roller 71 comes into contact with the upper surface of the uppermost sheet S in the raised sheet bundle SS. When the pickup roller 71 is raised to a predetermined position, the rotation switch of the pickup roller 71 is turned on. The rotation of the sheet feed tray 56 is stopped. The pickup roller 71 rotates to supply the uppermost sheet S from the sheet feed cassette 51 in the +W direction indicated in FIG. 5.

Each time the sheet S is supplied, the pickup roller 71 is gradually lowered. When the pickup roller 71 is lowered to a predetermined position, the rotation switch of the pickup roller 71 is turned off. The rotation of the pickup roller 71 is stopped. The sheet feed tray 56 is rotated to raise the end portion of the sheet bundle SS in the +X-direction and the pickup roller 71. When the pickup roller 71 is raised to a predetermined position, the rotation switch of the pickup roller 71 is turned on. The pickup roller 71 rotates, and the supply of the sheet S is resumed.

In the present embodiment, the W direction is a direction in which the sheet S is conveyed from the sheet feed cassette 51 (hereinafter also referred to as the conveyance direction). The W direction is along the placing surface 57 when viewed from the Y direction. The +W direction is a downstream side in a direction in which the sheet S is conveyed. The −W direction is the upstream side in the direction in which the sheet S is conveyed, and is the opposite side in the +W direction. The conveying device 60 supplies the sheet S from the sheet feed cassette 51 in the +W direction. The cassette front wall 52 is a side wall of the sheet feed cassette 51 in the +W direction of the sheet storage space 55. In the present embodiment, the W direction is orthogonal to the Y direction, and the +W direction is a direction between the +Z direction and the +X direction.

The conveyance guide 61 is disposed in the +Z direction of the sheet feed cassette 51. The conveyance guide 61 guides conveyance of the sheet S supplied from the sheet feed cassette 51 in the +W direction. The conveyance guide 61 has a pair of upper surface guides 62. The upper surface guides 62 are plate-shaped along WY plane. However, the upper surface guides 62 may not be parallel to WY plane. Each upper surface guides 62 is not movable in the Z direction. Note that at least a part of the upper surface guide 62 may be movable in the Z direction independently of the sheet feed tray 56. For example, a part of the upper surface guide 62 may be movable in the Z direction in synchronization with the pickup roller 71. The upper surface guide 62 is at least at a position in the +Z direction of the cassette front wall 52. The upper surface guide 62 extends from a position of the cassette front wall 52 in the +Z direction to both sides along the W direction. The end portion in the −W direction of the upper surface guide 62 is located on the −W direction side of the rotational axis Q of the pickup roller 71. The end in the −W direction of the upper surface guide 62 is positioned on the +W direction side of the top edge of the lifting member 80. The upper surface guide 62 can contact the upper surface of the sheet S conveyed in the +W direction from the sheet feed cassette 51.

Figure 7:
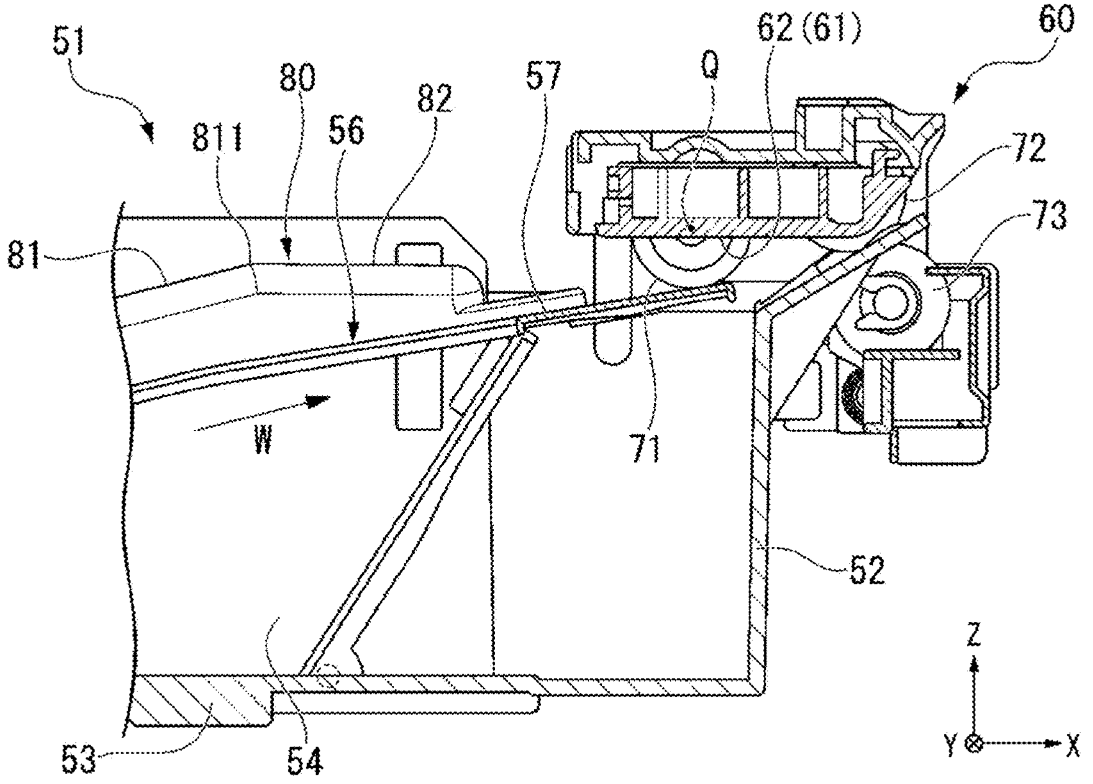
FIG. 7 is a cross-sectional view of the sheet feed cassette and the conveying device at a position corresponding to VII-VII of FIG. 6.
Figure 8:
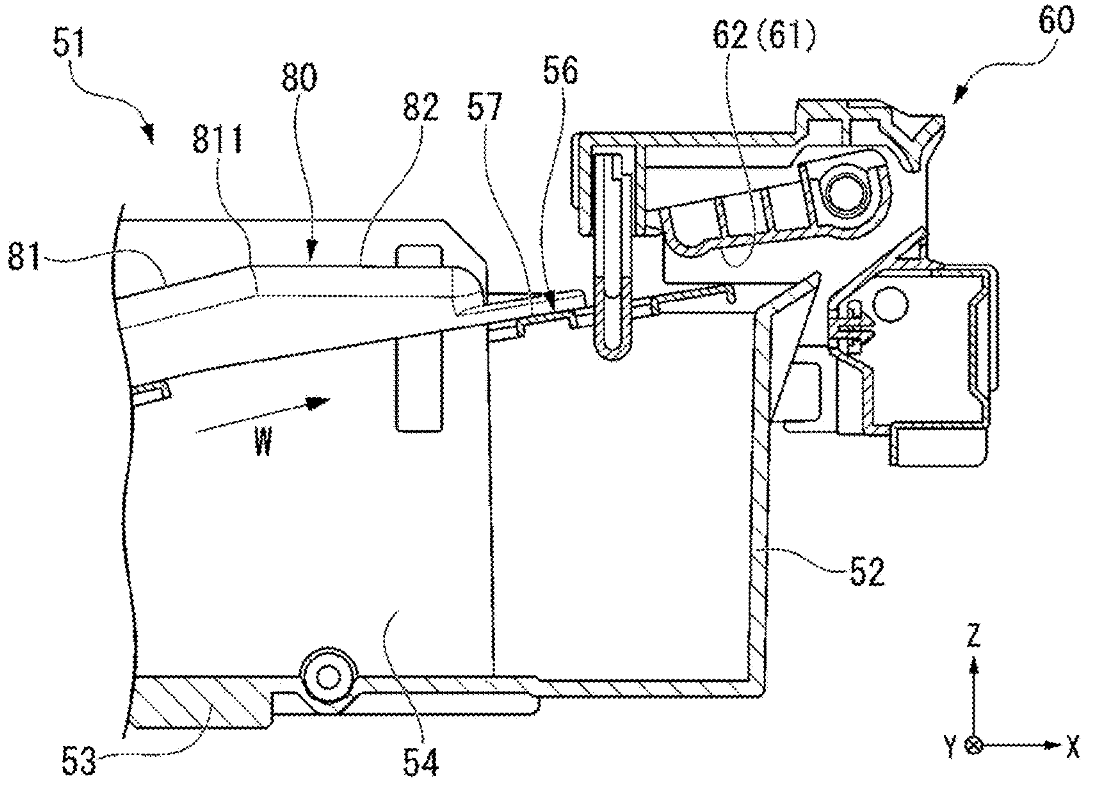
FIG. 8 is a cross-sectional view of the sheet feed cassette and the conveying device at a position corresponding to VIII-VIII of FIG. 6.

FIG. 7 is a cross-sectional view of the sheet feed cassette 51 and the conveying device 60 at a position corresponding to VII-VII of FIG. 6. FIG. 8 is a cross-sectional view of the sheet feed cassette 51 and the conveying device 60 at a position corresponding to VIII-VIII of FIG. 6. As shown in FIGS. 7 and 8, the pair of upper surface guides 62 are disposed apart from each other in the Y direction. The pair of upper surface guides 62 are on opposite sides with the pickup roller 71 interposed therebetween. The upper surface guide 62 is disposed in the +Z direction with respect to a portion of the pickup roller 71 that comes into contact with the sheet S.

As shown in FIGS. 5 and 6, the sheet feed roller 72 and the separation roller 73 are arranged in the +W direction of the pickup roller 71. The sheet feed roller 72 and the separation roller 73 are arranged side by side in the normal direction of WY plane. The sheet feed roller 72 and the separation roller 73 abut each other to form a nip N. The sheet S guided by the conveyance guide 61 and conveyed in the +W direction reaches the nip N.

The sheet feed roller 72 and the separation roller 73 rotate about a rotation shaft parallel to the Y direction. The sheet feed roller 72 is rotationally driven by a motor or the like. The separation roller 73 has a torque limiter. In some cases, a plurality of sheets S are supplied from the sheet feed cassette 51 in an overlapping manner. Those sheets S reach the nip N. The lower sheet S is stopped at the position of the separation roller 73 by the action of the torque limiter of the separation roller 73. The upper sheet S is conveyed in the +W direction by the sheet feed roller 72. After the upper sheet S is conveyed, the stopped lower sheet S is conveyed in the +W direction by the sheet feed roller 72. The sheet feed roller 72 and the separation roller 73 separate and convey the plurality of sheets S supplied from the sheet feed cassette 51 in the +W direction.

As shown in FIGS. 4 and 5, the sheet feed cassette 51 further includes a pair of lifting members 80. The lifting members 80 are disposed in the sheet storage space 55. The lifting members 80 are located on the −X direction side of the cassette front wall 52. Each lifting member 80 protrudes from the placing surface 57 of the sheet feed tray 56 in the +Z direction. The lifting member 80 is supported by the sheet feed tray 56. The lifting member 80 is displaced integrally with the sheet feed tray 56 by the rotation of the sheet feed tray 56. The pair of lifting members 80 are spaced apart in the Y direction. The pair of lifting members 80 are arranged at equal intervals in the Y direction with respect to the center of the sheet storage space 55 in the Y direction. The lifting member 80 is not movable in the Y direction. Since each lifting member 80 is not movable in the Y direction, it can be in a state of being arranged along the side guide 54 on the same side in the Y direction and a state of being arranged with a gap in the Y direction with respect to the side guide 54 on the same side in the Y direction. The lifting members 80 are disposed at both ends in the Y direction of the sheet storage space 55 in a state of being disposed along the side guides 54 on the same side in the Y direction.

The lifting member 80 has a length and extends in the W direction. The longitudinal direction of the lifting member 80 is the X direction in the regular state of the sheet feed tray 56. The lifting member 80 has a substantially constant width in the Y direction. The end portion in the −W direction of the lifting member 80 is located on the −W direction side of the end portion in the −W direction of the placing surface 57 of the sheet feed tray 56 between the pair of side guides 54. The end of the lifting member 80 in the −W direction is cut out to avoid contacting the cassette bottom wall 53 on the −X direction side of the placing surface 57 when the lifting member 80 is moved together with the sheet feed tray 56.

Each lifting member 80 includes an upper end surface 81 and an inclined surface 82. The upper end surface 81 extends along the longitudinal direction of the lifting member 80. The upper end surface 81 extends in parallel with the placing surface 57 of the sheet feed tray 56. The upper end surface 81 extends in the W direction with a constant width as viewed from the Z direction. The upper end surface 81 in the −Z direction is located on the −Z direction side of the edge of the side guide 54 in the +Z direction. The upper end surface 81 is a curved surface convex in the +Z direction. The end portion of the upper end surface 81 in the −W direction is located on the −W direction side of the end portion in the −W direction of the placing surface 57 of the sheet feed tray 56 between the pair of side guides 54. The inclined surface 82 is disposed closer to the end portion of the lifting member 80 in the +W direction than the upper end surface 81. The inclined surface 82 extends from an end portion of the upper end surface 81 in the +W direction toward an end portion of the lifting member 80 in the +W direction. The inclined surface 82 extends in the W direction with the same width as the upper end surface 81 when viewed from the Z direction. The inclined surface 82 extends from the end portion of the upper end surface 81 in the +W direction toward the placing surface 57 side of the sheet feed tray 56. The inclined surface 82 extends at a constant inclination angle with respect to the upper end surface 81. The inclined surface 82 has substantially the same cross-sectional shape as the upper end surface 81.

As shown in FIG. 7, the entire inclined surface 82 and the end portion 811 of the upper end surface 81 in the +W direction are located on the −W direction side of the end portion of the sheet feed tray 56 in the +W direction. The entire inclined surface 82 and the end portion 811 in the +W direction of the upper end surface 81 are positioned on the −W direction side of the end portion in the +W direction of the sheet bundle SS placed on the placing surface 57 of the sheet feed tray 56 (see FIG. 9). The entire inclined surface 82 and the end portion 811 of the upper end surface 81 in the +W direction are positioned on the −W direction side of the rotational axis Q of the pickup roller 71. The entire inclined surface 82 and the end portion 811 of the upper end surface 81 in the +W direction are located on the −W direction side of the end portion of the upper surface guide 62 in the −W direction.

A state of the sheet S stored in the sheet storage space 55 will be described. As shown in FIG. 3, the sheet S has a wireless tag T at an end portion in the +X direction of the sheet S in the center portion in the Y direction thereof. The thickness of the center portion of the sheet S in the Y direction is larger than that of the other portions by disposing the wireless tag T.

Figure 9:
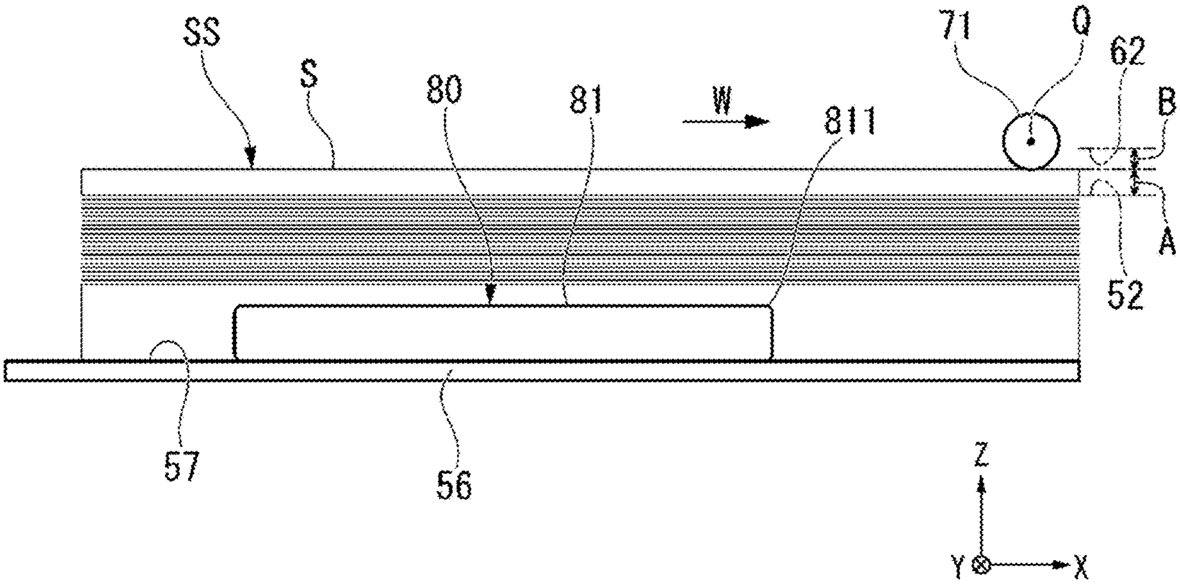
FIG. 9 is a front view of the sheet feed cassette.
Figure 10:
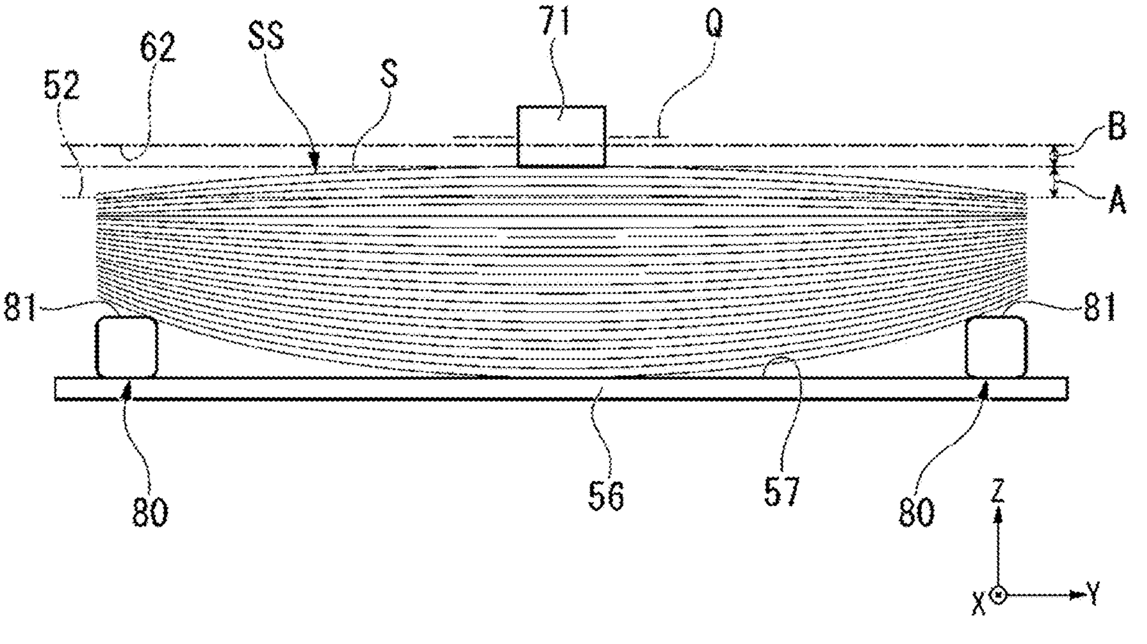
FIG. 10 is a right side view of the sheet feed cassette shown in FIG. 9.

FIG. 9 is a front view of the sheet feed cassette 51. FIG. 10 is a right side view of the sheet feed cassette 51 shown in FIG. 9. As shown in FIGS. 9 and 10, the sheet bundle SS is placed on the placing surface 57 of the sheet feed tray 56. The thickness of the sheet bundle SS in the center portion in the Y direction is larger than that of the other portions. The thickness of the sheet bundle SS decreases from the center portion to the end portion in the Y direction. In the sheet feed tray 56, the center portion in the Y direction in the sheet bundle SS contacts the pickup roller 71, and the pickup roller 71 is pushed up in the sheet bundle SS and rises from the lowering end position until it reaches a predetermined position.

The sheet bundle SS contacts the upper end surfaces 81 of the pair of lifting members 80 spaced apart in the Y-direction. A portion of the sheet bundle SS inside the both end portions in the Y-direction contacts the upper end surface 81 of the lifting member 80. Both ends of the sheet bundle SS in the Y-direction are lifted from the placing surface 57 of the sheet feed tray 56 by the lifting member 80. Hereinafter, the reference of the height of the sheet bundle SS and the lifting member 80 is referred to as the placing surface 57. The height at which both ends of the sheet bundle SS in the Y direction are lifted by the lifting member 80 may not coincide with the height of the upper end surface 81 of the lifting member 80. For example, both end portions of the sheet bundle SS in the Y-direction are lifted higher than the height of the upper end surface 81 of the lifting member 80 by the stiffness of the sheet S. The end portion of the sheet bundle SS in the +W direction is on the +W direction side of the end portion of the upper end surface 81 of the lifting member 80 in the +W direction. The sheet bundle SS may be in non-contact with the inclined surface 82 (see FIG. 5) of the lifting member 80. Both corner portions located at the end portion in the Y direction at the end portion in the +W direction of the sheet bundle SS are lifted by the stiffness of the sheet bundle SS and are in non-contact with the placing surface 57. Hereinafter, the end portion of the sheet bundle SS and the sheet S in the +W direction will be referred to as the downstream end.

The number of sheets of the bundle SS shown in FIGS. 9 and 10 is the maximum limit of stackable sheets. The height of both corners in the Y-direction at the downstream end of the sheet bundle SS of the number of stackable sheets is lower than that of the other portions. The height of the center portion in the Y-direction at the downstream end in the sheet bundle SS of the number of stackable sheets is higher than that of the other portions. Both end portions in the Y direction of the uppermost sheet S in the sheet bundle SS of the number of stackable sheets hang down with respect to the center portion in the Y direction. Here, the distance in the Z direction between the cassette front wall 52 and the contact point of the pickup roller 71 with the sheet S is defined as the distance A. The height of the center portion in the Y direction and the height of both corner portions in the Y direction coincide with the distance A at the downstream end of the sheet bundle SS of the number of stackable sheets. The uppermost sheet S in the sheet bundle SS is conveyed in the +W-direction by the pickup roller 71 without being caught by the cassette front wall 52. When the sheet S is discharged and the number of sheets in the sheet bundle SS is reduced, the sheet feed tray 56 and the lifting member 80 are integrally raised.

As the number of sheets in the sheet bundle SS increases from the stackable number of sheets, both end portions in the Y direction of the uppermost sheet S in the sheet bundle SS hang more than the center portion in the Y direction. Since the distance A is unchanged, the uppermost sheet S in the sheet bundle SS having a larger number of sheets than the stackable number is caught by the cassette front wall 52 when being conveyed in the +W direction by the pickup roller 71.

Figure 11:
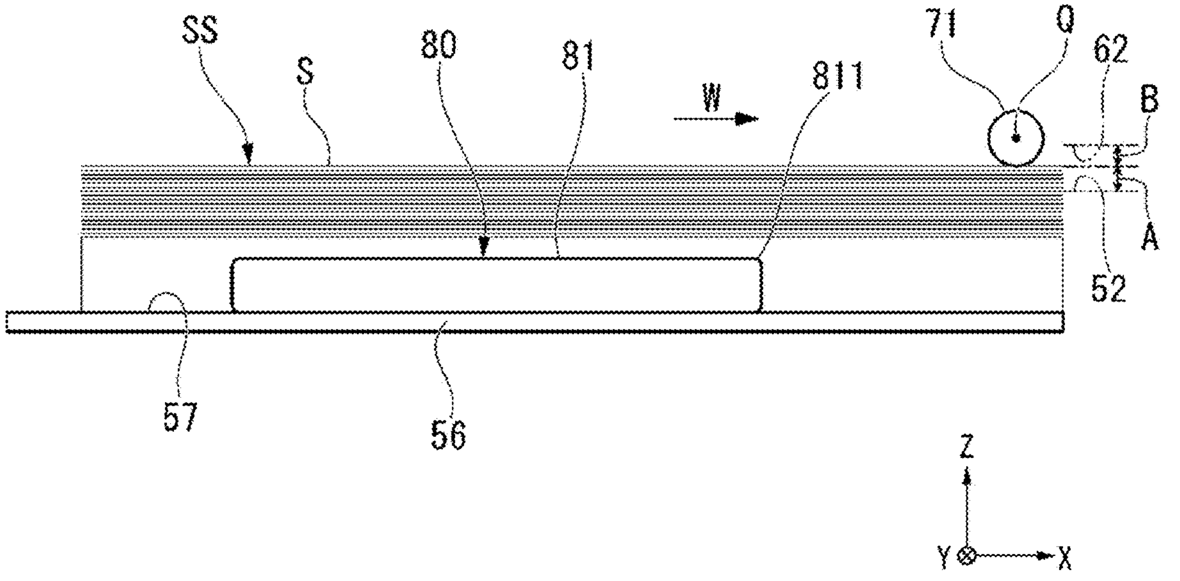
FIG. 11 is a front view of the sheet feed cassette.
Figure 12:
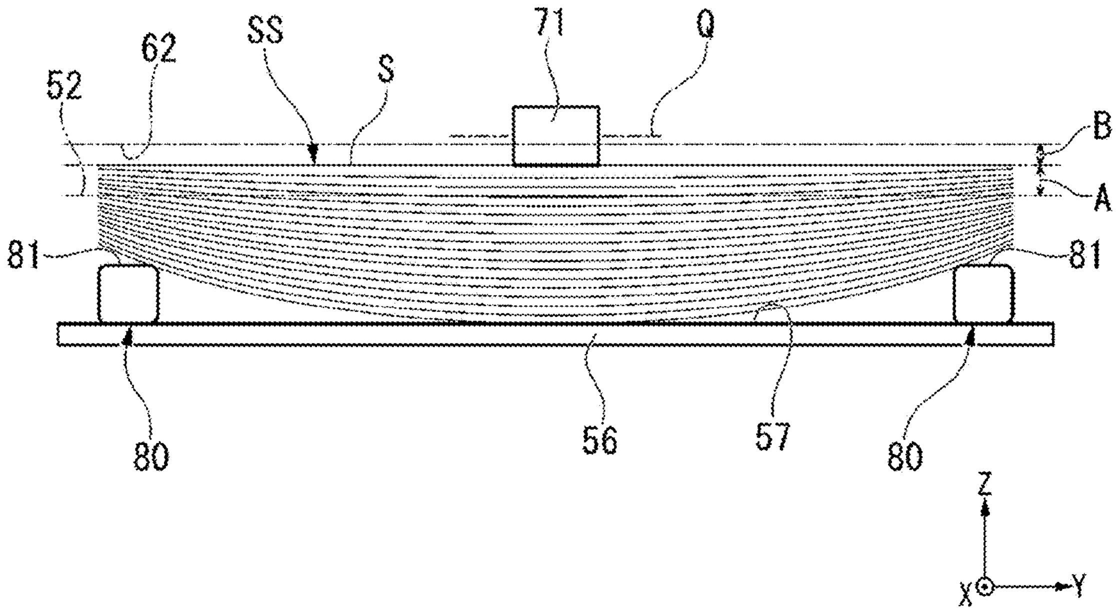
FIG. 12 is a right side view of the sheet feed cassette shown in FIG. 11.

FIG. 11 is a front view of the sheet feed cassette 51, showing a state in which the sheet S is discharged from the state shown in FIG. 9. FIG. 12 is a right side view of the sheet feed cassette 51 shown in FIG. 11. In the cases shown in FIGS. 11 and 12, the number of sheets in the bundle SS is a first number smaller than the number of stackable sheets. At the downstream end of the first number of sheets of the bundles SS, the heights of both corner portions in the Y direction coincide with the heights of the center portions in the Y direction. The uppermost sheet S in the first number of sheet bundles SS is conveyed in the +W-direction by the pickup roller 71 without being caught by the cassette front wall 52.

Figure 13:
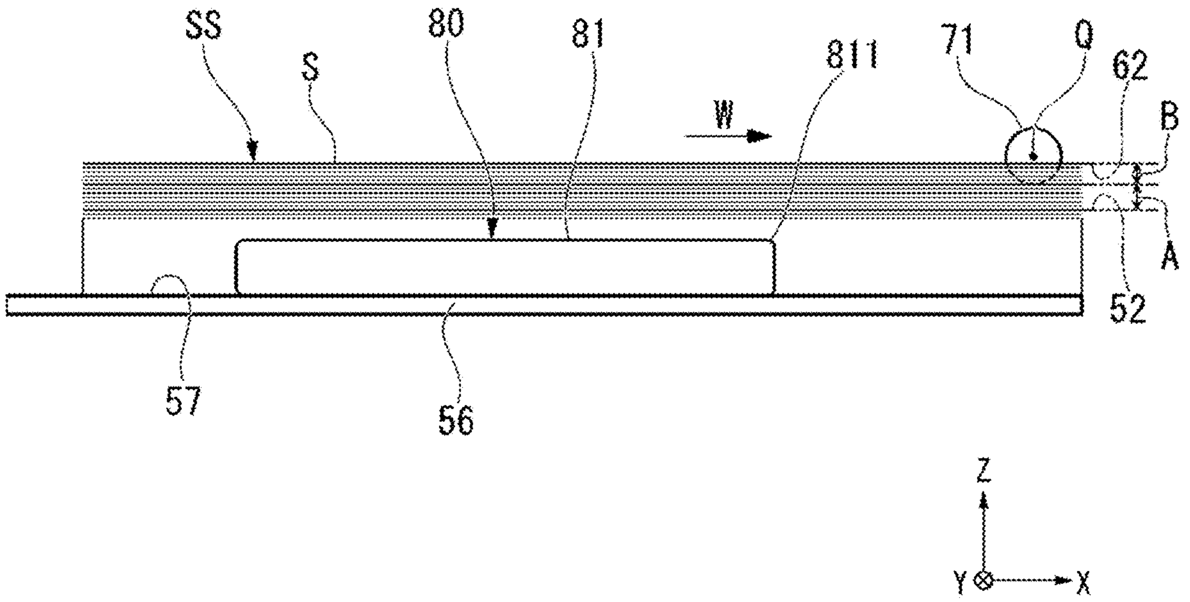
FIG. 13 is a front view of the sheet feed cassette.
Figure 14:
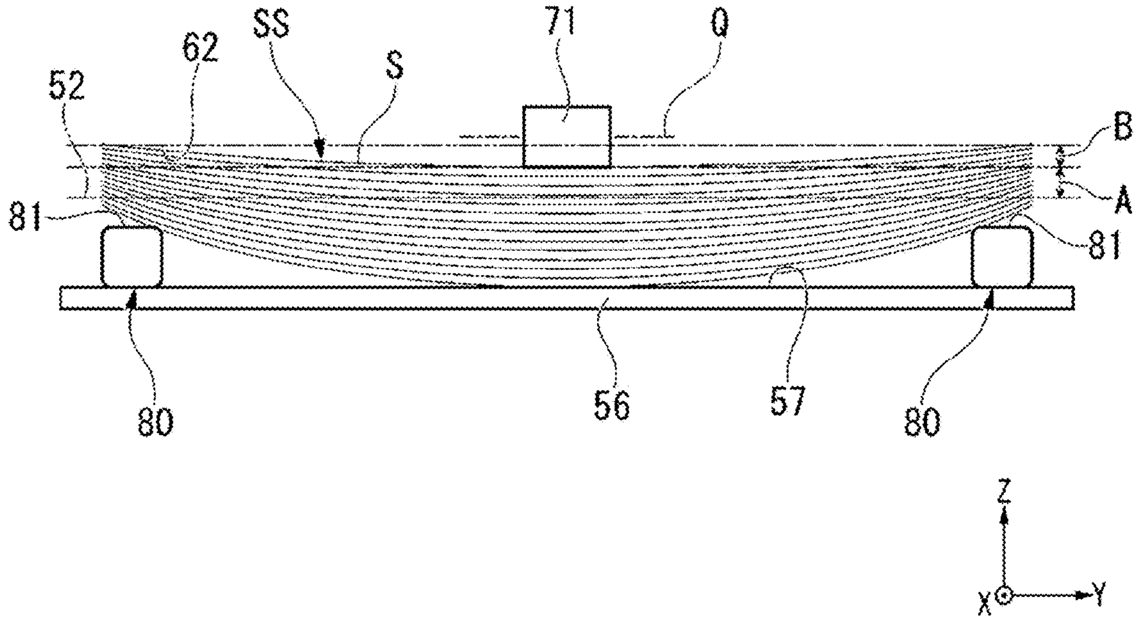
FIG. 14 is a right side view of the sheet feed cassette shown in FIG. 13.

FIG. 13 is a front view of the sheet feed cassette 51, showing a state in which the sheet S is discharged from the state shown in FIG. 11. FIG. 14 is a right side view of the sheet feed cassette 51 shown in FIG. 13. In FIG. 13 and FIG. 14, the number of sheets in the bundle SS is a second number smaller than the first number. At the downstream end of the second number of sheets in the bundles SS, the height of both corners in the Y direction is higher than the height of the other corners. At the downstream end of the second number of sheets in the bundles SS, the height of the center portion in the Y direction is lower than that of the other portions. Here, the interval in the Z direction between the upper surface guide 62 and the contact point of the pickup roller 71 with the sheet S is defined as the distance B. At the downstream end of the second number of sheets in the bundles SS, the difference between the height of the center portion in the Y direction and the height of both corner portions in the Y direction coincides with the distance B. The second number is the minimum number of sheets in the sheet bundle SS that does not touch the upper surface guides 62. The uppermost sheet S in the second number of sheet bundles SS is conveyed in the +W direction by the pickup roller 71 without being caught by the upper guide 62.

Figure 15:
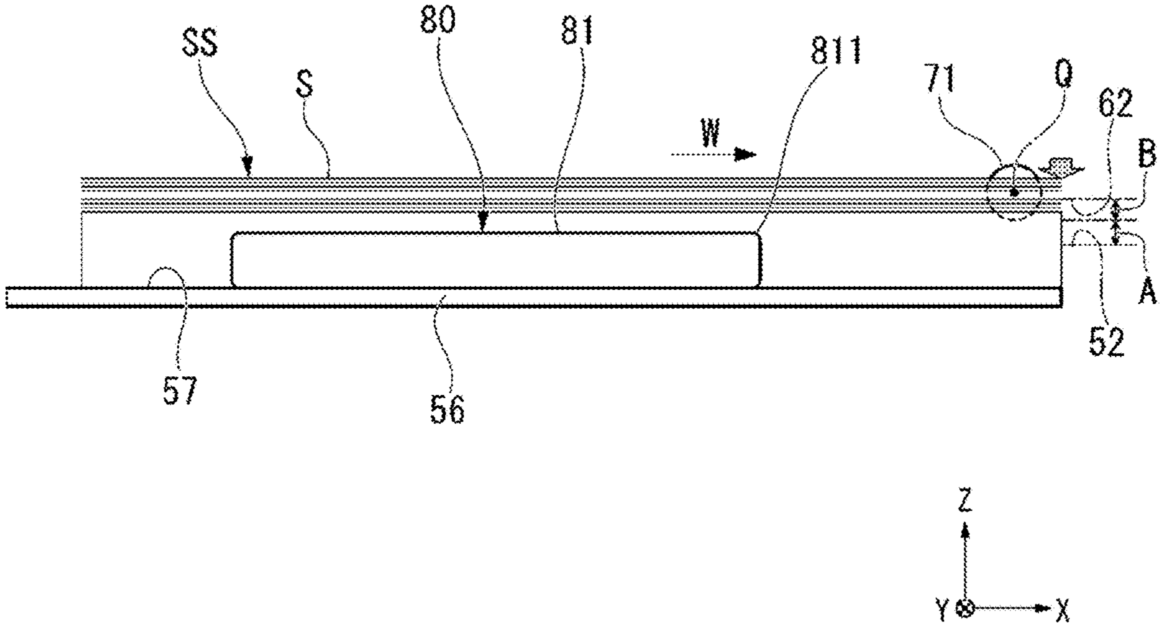
FIG. 15 is a front view of the sheet feed cassette.
Figure 16:
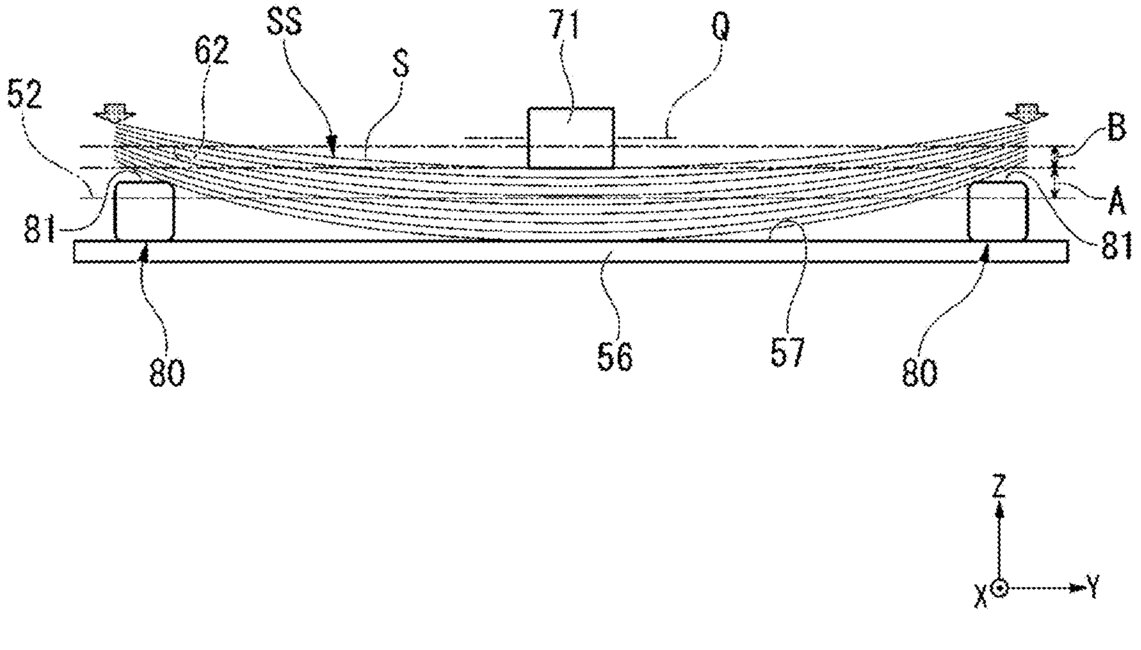
FIG. 16 is a right side view of the sheet feed cassette shown in FIG. 15.

FIG. 15 is a front view of the sheet feed cassette 51, showing a state in which the sheet S is discharged from the state shown in FIG. 13. FIG. 16 is a right side view of the sheet feed cassette 51 shown in FIG. 15. In FIG. 15 and FIG. 16, the number of sheets in the bundle SS is a third number smaller than the second number. The third number includes one sheet. At the downstream end of the third number of sheets in the bundles SS, the height of both corners in the Y direction is higher than the height of the other corners. At the downstream end of the third number of sheets in the bundles SS, the height of the center portion in the Y direction is lower than that of the other portions. Both corners in the Y direction at the downstream end of the third number of sheets in the bundles SS are contacted with the upper surface guides 62 from the −Z direction. The upper end surface 81 of the lifting member 80 does not exist in the −Z direction of both corners in the Y direction at the downstream end of the third number of sheets in the bundles SS. Both corners in the Y direction at the downstream end of the third number of sheet bundles SS are displaced toward the placing surface 57 as the sheet feed tray 56 is raised without being hindered by the upper end surface 81 of the lifting member 80 by contacting the upper surface guide 62. At the downstream end of the third number of sheets in the bundles SS, the difference between the height of the center portion in the Y direction and the height of both corner portions in the Y direction coincides with the distance B. The contact force of the upper surface guides 62 applied to the uppermost sheet S of the sheet bundle SS is set to such an extent that the conveyance of the sheet S is not hindered. The uppermost sheet S in the third number of sheet bundles SS is conveyed in the +W-direction by the pickup roller 71 without being caught by the upper guide 62.

In the present embodiment, a pair of lifting members 80 protruding in the +Z direction from the placing surface 57 of the sheet feed tray 56 and lifting both ends in the Y direction in the sheet bundle SS are provided. If the lifting member 80 is not provided, even if the number of sheets in the bundle SS is relatively small, both end portions of the uppermost sheet S in the sheet bundle SS in the Y-direction may hang down with respect to the central portion. This aspect of the sheet bundle SS appears remarkably as the number of sheets in the bundle SS increases. If both end portions in the Y direction of the uppermost sheet S hang down, there is a possibility that a corner portion on the outside in the Y direction of the end portion in the +W direction of the sheet S is caught during conveyance. Specifically, the center portion of the uppermost sheet S in the Y direction contacts the pickup roller 71, and the corner portion on the Y direction outer side at the downstream end of the uppermost sheet S may interfere with the cassette front wall 52 positioned in the −Z direction with respect to the pickup roller 71.

According to the present embodiment, since both end portions in the Y direction of the sheet bundle SS are lifted by the lifting member 80, both end portions in the Y direction of the uppermost sheet S in the sheet bundle SS are unlikely to hang with respect to the central portion. Therefore, not only when the number of sheets in the sheet bundle SS is relatively small, but also when the number of sheets in the sheet bundle SS is relatively large, the sheet S is less likely to be caught during the conveyance, and the number of stackable sheets that can be placed on the sheet feed tray 56 can be increased.

Further, when the number of sheets in the sheet bundle SS is relatively small, both end portions in the Y direction of the sheet bundle SS are lifted by the lifting member 80, so that both end portions in the Y direction of the uppermost sheet S may be positioned in the +Z direction with respect to the central portion. When both end portions in the Y direction of the uppermost sheet S are positioned in the +Z direction with respect to the central portion, there is a possibility that a corner portion in the Y direction at the downstream end of the uppermost sheet S is caught by the upper surface guide 62 during conveyance.

In the present embodiment, the lifting member 80 includes an upper end surface 81 that contacts the sheet bundle SS. The end portion of the upper end surface 81 of the lifting member 80 in the +W direction is located on the −W direction side of the downstream end of the sheet bundle SS. According to this configuration, the lifting member 80 is not in contact with the downstream end of the sheet bundle SS. The lower end of the sheet bundle SS is not sandwiched between the lifting member 80 and the upper guide 62. A corner portion in the Y direction at the downstream end of the sheet bundle SS is pushed down even when it contacts the upper surface guide 62. Therefore, the contact pressure of the sheet bundle SS with respect to the upper surface guide 62 is reduced, and the uppermost sheet S can be conveyed without being caught in the +W direction.

As described above, the sheet feeding apparatus 1 can suppress the supply failure of the sheet S.

The lifting member 80 is in non-contact with the downstream end of the sheet bundle SS while the second number of sheet bundles SS are in contact with the pickup roller 71. With this configuration, when the number of the sheets in the sheet bundle SS is smaller than the second number, a space is provided at the downstream end of the sheet bundle SS so as to be displaced downward. Therefore, a configuration that achieves the above-described effects can be obtained.

In the sheet bundle SS having a smaller number of sheets than the second number of sheets, the corner portion in the Y direction at the downstream end thereof can be brought into contact with the upper surface guide 62 from below, and is displaced toward the placing surface 57 of the sheet feed tray 56 by being brought into contact with the upper surface guide 62. According to this configuration, when the corner portion in the Y direction at the downstream end of the sheet bundle SS comes into contact with the upper surface guide 62, the contact pressure of the sheet bundle SS with respect to the upper surface guide 62 is reduced. Therefore, a configuration that achieves the above-described effects can be obtained.

The end portion of the upper end surface 81 of the lifting member 80 in the +W direction is located on the −W direction side of the end portion of the upper surface guide 62 in the −W direction. With this configuration, the sheet bundle SS is not sandwiched between the upper end surface 81 of the lifting member 80 and the upper surface guides 62. Therefore, the corner portion in the Y direction at the downstream end of the sheet bundle SS is pushed down with a smaller contact pressure when it comes into contact with the upper surface guide 62. Therefore, the uppermost sheet S can be conveyed without being caught in the +W direction.

The lifting member 80 has an inclined surface 82 extending from an end portion of the upper end surface 81 in the +W direction toward the placing surface 57. According to this configuration, the corner portion of the lifting member 80 corresponding to the end portion of the upper end surface 81 in the +W direction becomes an obtuse angle when viewed from the Y direction. Therefore, it is possible to prevent the lifting member 80 from biting into the sheet bundle SS pushed down by the upper surface guide 62. Furthermore, the sheet bundle SS can also be supported by the inclined surface 82 when the downstream end of the sheet bundle SS is pushed down by the upper guide 62. Accordingly, the lower end of the sheet bundle SS can be prevented from being excessively pushed down by the upper surface guides 62.

An end portion of the upper end surface 81 of the lifting member 80 in the +W direction is located on the −W direction side of the pickup roller 71. According to this configuration, in the sheet bundle SS, a portion in contact with the upper end surface 81 of the lifting member 80 and a portion in contact with the pickup roller 71 are displaced in the W direction. Therefore, the lifting member 80 and the pickup roller 71 are brought close to each other, so that the lifting member 80 or the pickup roller 71 can be prevented from biting into the sheet bundle SS.

The upper end surface 81 of the lifting member 80 is an upwardly convex curved surface. With this configuration, it is possible to prevent the upper end surface 81 of the lifting member 80 from biting into the sheet bundle SS.

The lifting members 80 are arranged at equal intervals in the Y direction with respect to the center in the Y direction between the pair of side guides 54. With this configuration, both end portions of the sheet bundle SS in the Y direction are lifted symmetrically in the Y direction. Therefore, it is possible to prevent the conveyed sheet S from losing its posture, and it is difficult for the sheet S to be caught during conveyance. Therefore, the supply failure of the sheet S is suppressed.

The center portion of the sheet bundle SS in the Y direction is thicker than both end portions of the sheet bundle SS in the Y direction. According to this configuration, when the lifting member 80 is not provided, both end portions of the uppermost sheet S in the Y direction hang down with respect to the central portion regardless of the number of the sheet bundle SS. Therefore, by providing the lifting member 80, the above-described operation and effect can be effectively achieved.

The sheet S has a wireless tag T in the center portion in the Y direction. According to this configuration, the center portion of the sheet bundle SS in the Y direction is thicker than the both end portions. Therefore, an optimum configuration that achieves the above-described effects is obtained.

In the above-described embodiment, the sheet bundle SS is moved in the Z direction by tilting the sheet feed tray 56 by rotating. However, the sheet feed tray may be configured to move the sheet bundle in the Z direction by translating in the Z direction.

In the above-described embodiment, the lifting member 80 includes the inclined surface 82. However, the lifting member 80 may not be provided with an inclined surface.

In the above embodiment, the lifting member 80 is not movable in the Y direction. However, the lifting member may be movable in the Y direction. For example, the lifting members may be moved in the Y direction together with the side guides 54 on the same side in the Y direction. In this case, the lifting member may be arranged along the side guide on the same side in the width direction or may be arranged with a gap in the width direction with respect to the side guide as long as both end portions in the width direction of the sheet bundle can be lifted.

According to at least one embodiment described above, the sheet of the uppermost layer can be conveyed without being caught on the downstream side in the conveyance direction by the end portion of the upper end surface of the lifting member on the downstream side in the conveyance direction being positioned upstream of the end portion of the sheet bundle on the downstream side in the conveyance direction. Therefore, the sheet feeding apparatus can suppress the sheet feeding failure.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A sheet feeding apparatus comprising:

a tray on which a plurality of sheets can be stacked, the tray being movable in a vertical direction to lift the sheets;

a pickup roller that is rotatable to convey an uppermost sheet of the sheets in a conveyance direction when the sheets are lifted and pressed against the pickup roller;

a first guide that is disposed adjacent to the pickup roller and guides the uppermost sheet conveyed by the pickup roller along the conveyance direction; and a pair of lifting members that support the sheets that are stacked in the tray, wherein the lifting members extend along the conveyance direction, are spaced apart in a width direction of the sheets that is transverse to the conveyance direction, and are movable in the vertical direction together with the tray, and each of the lifting members includes:

a first surface extending in the conveyance direction and parallel to a bottom surface of the tray, and a second surface inclined with respect to the bottom surface of the tray, wherein, in the conveyance direction, an upstream end of the second surface is connected to a downstream end of the first surface, and a downstream end of the second surface is located upstream of a rotational axis of the pickup roller.

2. The sheet feeding apparatus according to claim 1, wherein in the conveyance direction, the downstream end of each of the lifting members is located upstream of a downstream end of the stacked sheets.

3. The sheet feeding apparatus according to claim 1, wherein when the stacked sheets are lifted by the lifting members, when a total number of the sheets is a first number, the uppermost sheet contacts the pickup roller but does not contact the first guide, and when the total number of the sheets is less than the first number, two sides of the uppermost sheet parallel to the conveyance direction contact the first guide.

4. The sheet feeding apparatus according to claim 1, wherein in the conveyance direction, the downstream end of each of the lifting members is located upstream of an upstream end of the first guide.

5. The sheet feeding apparatus according to claim 1, further comprising:

a pair of second guides between which the sheets are stacked, wherein each of the lifting members is disposed adjacent to a corresponding one of the second guides.

6. The sheet feeding apparatus according to claim 1, further comprising:

a sheet feed cassette including the tray and the pair of lifting members and disposed below the pickup roller.

7. The sheet feeding apparatus according to claim 6, wherein the tray is rotatable to lift the sheet, and the bottom surface of the tray is inclined with respect to a bottom surface of the sheet feed cassette when the tray lifts the sheet.

8. The sheet feeding apparatus according to claim 1, wherein the downstream end of the second surface of each of the lifting members is located upstream of a downstream end of the tray.

9. The sheet feeding apparatus according to claim 1, wherein the first and second surfaces of each of the lifting members form an obtuse angle when viewed in the width direction.

10. An image forming apparatus comprising:

a tray on which a plurality of sheets can be stacked, the tray being movable in a vertical direction to lift the sheets;

a pickup roller that is rotatable to convey an uppermost sheet of the sheets in a conveyance direction when the sheets are lifted and pressed against the pickup roller;

a first guide that is disposed adjacent to the pickup roller and guides the uppermost sheet conveyed by the pickup roller along the conveyance direction;

a pair of lifting members that support the sheets that are stacked in the tray, wherein the lifting members extend along the conveyance direction, are spaced apart in a width direction of the sheets that is transverse to the conveyance direction, and are movable in the vertical direction together with the tray; and an image forming station configured to form an image on the conveyed uppermost sheet through a transfer belt, wherein each of the lifting members includes:

a first surface extending in the conveyance direction and parallel to a bottom surface of the tray, and a second surface inclined with respect to the bottom surface of the tray, wherein, in the conveyance direction, an upstream end of the second surface is connected to a downstream end of the first surface, and a downstream end of the second surface is located upstream of a rotational axis of the pickup roller.

11. The image forming apparatus according to claim 10, wherein in the conveyance direction, the downstream end of each of the lifting members is located upstream of a downstream end of the stacked sheets.

12. The image forming apparatus according to claim 10, wherein when the stacked sheets are lifted by the lifting members, when a total number of the sheets is a first number, the uppermost sheet contacts the pickup roller but does not contact the first guide, and when the total number of the sheets is less than the first number, two sides of the uppermost sheet parallel to the conveyance direction contact the first guide.

13. The image forming apparatus according to claim 10, wherein in the conveyance direction, the downstream end of each of the lifting members is located upstream of an upstream end of the first guide.

14. The image forming apparatus according to claim 10, further comprising:

a pair of second guides between which the sheets are stacked, wherein each of the lifting members is disposed adjacent to a corresponding one of the second guides.

15. The image forming apparatus according to claim 10, further comprising:

a sheet feed cassette including the tray and the pair of lifting members and disposed below the pickup roller.

16. The image forming apparatus according to claim 15, wherein the tray is rotatable to lift the sheet, and the bottom surface of the tray is inclined with respect to a bottom surface of the sheet feed cassette when the tray lifts the sheet.

17. The image forming apparatus according to claim 10, further comprising:

a wireless tag communication device configured to communicate with a wireless tag attached to the conveyed uppermost sheet.

18. The image forming apparatus according to claim 10, wherein the downstream end of the second surface of each of the lifting members is located upstream of a downstream end of the tray.

19. The image forming apparatus according to claim 10, wherein the first and second surfaces of each of the lifting members form an obtuse angle when viewed in the width direction.

* * * * *